United States Patent
Meyer et al.

(10) Patent No.: US 8,434,717 B2
(45) Date of Patent: May 7, 2013

(54) AIRCRAFT FRONT PORTION INCLUDING A CONCAVE BULKHEAD SEPARATING A NON-PRESSURIZED RADOME AREA AND A PRESSURIZED AREA

(75) Inventors: Cédric Meyer, Fonsorbes (FR); Bernard Guering, Montrabe (FR)

(73) Assignee: Airbus Operations SAS, Toulouse (FR)

( * ) Notice: Subject to any disclaimer, the term of this patent is extended or adjusted under 35 U.S.C. 154(b) by 681 days.

(21) Appl. No.: 12/686,761

(22) Filed: Jan. 13, 2010

(65) Prior Publication Data

US 2010/0176241 A1  Jul. 15, 2010

(30) Foreign Application Priority Data

Jan. 15, 2009  (FR) ..................... 09 50216

(51) Int. Cl.
 *B64C 1/10* (2006.01)
(52) U.S. Cl.
 USPC ........................................................ 244/121
(58) Field of Classification Search .................. 244/121, 244/119, 129.4, 133
 See application file for complete search history.

(56) References Cited

U.S. PATENT DOCUMENTS

| | | | |
|---|---|---|---|
| 4,080,579 A * | 3/1978 | Fassett ........................... | 333/117 |
| 5,062,589 A * | 11/1991 | Roth et al. ................ | 244/117 R |
| 5,121,128 A * | 6/1992 | van Lidth de Jeude et al. .............................. | 343/741 |
| 5,934,616 A * | 8/1999 | Reimers et al. ................ | 244/119 |
| 7,503,523 B2 | 3/2009 | Perez-Sanchez | |
| 7,677,498 B2 * | 3/2010 | Jeanneau et al. ............... | 244/131 |
| 8,226,870 B2 * | 7/2012 | Garcia Laja et al. .......... | 264/241 |
| 2002/0178583 A1* | 12/2002 | Holman et al. .................. | 29/897 |
| 2007/0164152 A1 | 7/2007 | Anderson et al. | |
| 2007/0164159 A1* | 7/2007 | Koch et al. ..................... | 244/121 |
| 2009/0173824 A1 | 7/2009 | Perez-Sanchez | |
| 2010/0155533 A1* | 6/2010 | McKinnie et al. ............ | 244/121 |
| 2010/0176240 A1 | 7/2010 | Guering et al. | |
| 2012/0228427 A1* | 9/2012 | Sayilgan et al. .............. | 244/121 |

FOREIGN PATENT DOCUMENTS

| | | |
|---|---|---|
| EP | 0 387 400 A2 | 9/1990 |
| EP | 0 847 916 A2 | 6/1998 |
| FR | 2 859 975 | 3/2005 |
| FR | 2 917 369 | 12/2008 |

OTHER PUBLICATIONS

L. F. E. Coombs, "Pressure Bulkheads", Flight Global [Online], XP-002544122, Dec. 19, 1958, p. 953.
Preliminary Search Report issued Sep. 3, 2009, in French Patent Application No. 0950216 with English translation of category of cited documents.

* cited by examiner

*Primary Examiner* — Christopher P Ellis
(74) *Attorney, Agent, or Firm* — Oblon, Spivak, McClelland, Maier & Neustadt, L.L.P.

(57) ABSTRACT

An aircraft front portion includes a sealed bulkhead separating a non pressurized radome area from a pressurized area. The sealed bulkhead is delimited by two surfaces opposite to each other, one being substantially concave when seen from the radome area and the other being substantially convex when seen from the pressurized area.

8 Claims, 6 Drawing Sheets

AIRCRAFT FRONT PORTION INCLUDING A CONCAVE BULKHEAD SEPARATING A NON-PRESSURIZED RADOME AREA AND A PRESSURIZED AREA

TECHNICAL FIELD

The present invention generally relates to an aircraft front portion, also called forward section, of the type comprising a non-pressurized radome area and a pressurized area adjacent to this radome area.

The invention is particularly suitable for all types of commercial aircraft.

STATE OF THE PRIOR ART

A standard aircraft front portion comprises a non-pressurized radome area directly separated from a pressurized area adjacent to the radome area by a sealed partition, called front bulkhead.

This bulkhead usually extends substantially perpendicularly to the longitudinal axis of the aircraft, and has a general usually plane or convex shape when the bulkhead is seen from the radome area.

Generally, a bulkhead has a general convex shape relatively to a reference point when the shape has a curvature such that the average radius of curvature is located, relatively to the bulkhead, on the side opposite to the reference point. By reference point is meant the location from which the bulkhead is seen or considered. Conversely, a bulkhead has a general so-called concave shape when the curvature of said shape is such that the average radius of curvature is located on the same side as the reference point.

The sealed bulkhead ensures pressure-tightness of the front portion of the aircraft, as well as the hold of the radar antenna. It may also ensure protection of the front portion against the impact of a foreign body, for example a bird.

The radome area is essentially delimited by the radome and the bulkhead. The non-pressurized area for housing the front landing gear, also called a landing gear casing, is usually offset towards the rear of the front portion relatively to the radome area.

Figure 1:
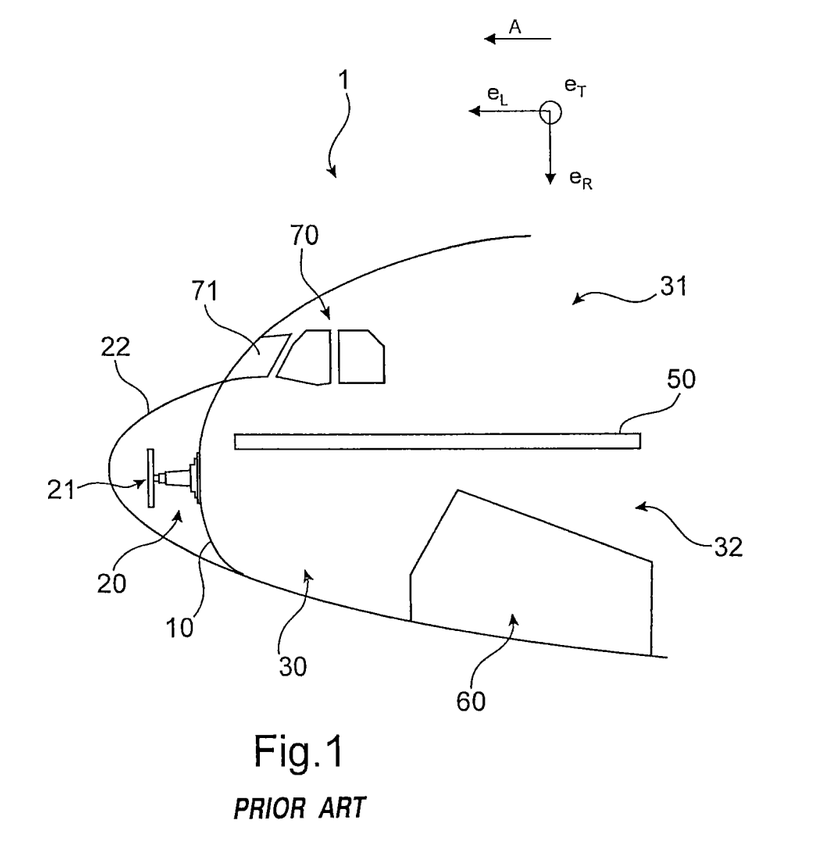
FIG. 1, already described, is a longitudinal sectional view of the front portion of an aircraft of the prior art, the sealed bulkhead of which has a convex shape.

FIG. 1 is a longitudinal sectional view of an exemplary aircraft front portion 1 comprising a bulkhead 10, convex when it is seen from the radome area.

The bulkhead 10 directly separates a non-pressurized radome area 20 from a pressurized area 30. The bulkhead 10 supports the radar antenna 21.

The bulkhead usually comprises many stiffeners (not shown), such as crossbeams, frames and spars, intended to stiffen the bulkhead. The bulkhead is actually subject to many mechanical stresses.

The bulkhead is notably subject to large tensile stresses when the air pressure in the pressurized area becomes greater than the air pressure present in the non-pressurized radome area. In other words, the air pressure in the pressurized area tends to push and deform the bulkhead towards the outside of the aircraft.

Further, the presence of the radar antenna attached to the bulkhead causes a flexural stress, the intensity of which is proportional to the distance between the radar antenna and a plane passing through the peripheral end of the bulkhead. This stress is therefore particularly high in the case of a bulkhead with a convex shape as illustrated in FIG. 1.

The risks of fatigue breaking of the bulkhead are high, which requires the use of the aforementioned stiffeners but also that the bulkhead be fixedly mounted on the skin of the fuselage in order to obtain a better distribution of the stresses.

Therefore it clearly appears that the use of this type of bulkhead has a certain number of drawbacks.

Thus, the presence of the stiffeners attached to the bulkhead leads to an addition of mass which is particularly detrimental to the performances of the aircraft, and as well as to a reduction of the already exiguous volume in this area.

Moreover, the sealed bulkhead is fixedly mounted on the fuselage skin, and therefore belongs to the primary structure of the aircraft. This is ineluctably expressed by a long manufacturing and mounting time, but also by difficulties during maintenance when a damaged bulkhead has to be replaced.

Finally, with this type of bulkhead the volume of the pressurized area cannot be optimized. On a purely informational basis, this area is usually used for the purposes of storing technical equipment specific to the aircraft or may be used as a resting area for the crew. The importance of maximizing the reduction in the volume of the non-pressurized radome area is easily understood for optimizing that of the pressurized area.

DISCUSSION OF THE INVENTION

The main object of the invention is to present an aircraft front portion finding a remedy to at least part of the drawbacks mentioned above relating to the embodiment of the prior art described with reference to FIG. 1.

To do this, the object of the invention is an aircraft front portion including a sealed bulkhead separating a non-pressurized radome area from a pressurized area.

According to the invention, said sealed bulkhead is delimited by two surfaces opposite to each other, one being substantially concave when it is seen from said radome area and the other one being substantially convex when it is seen from said pressurized area.

Thus, both surfaces of the sealed bulkhead each have a curvature such that the average radius of curvature is located on the side of the radome area. Each of these two surfaces of the bulkhead then extends from its centre towards its peripheral end, towards the front of the aircraft, and no longer towards the rear as in the embodiment of the prior art described earlier. It then appears that the volume of the radome area is thus particularly reduced, which consequently increases the volume of the pressurized area. Indeed, in order to house a same radar, the fact of using a sealed bulkhead in the sense of the invention enables volume reduction of the radome area delimited by this bulkhead and a radome, and increases that of the pressurized area.

Further, the mechanical constraints exerted by the pressure difference on either side of the bulkhead are no longer tensile stresses but compressive stresses. It is therefore no longer necessary to provide stiffeners attached to the bulkhead in order to stiffen it. A significant gain in volume and in mass is then achieved, which is particularly beneficial for the performances of the aircraft. The manufacturing of the bulkhead according to the invention is also substantially simplified, which then reduces the costs for mounting it.

Advantageously, said sealed bulkhead has a general substantially concave shape, said concavity being oriented towards said radome area.

Preferably, the curvature of each of the two surfaces of the sealed bulkhead is of the same sign in any point of the relevant surface. Further, it may be substantially constant in any point.

Preferably, said sealed bulkhead is removably mounted on a fuselage skin, with which it is possible to achieve significant gain in terms of productivity and maintenance. Indeed, unlike the embodiment of the prior art described earlier, it is no longer necessary to fixedly assemble the sealed bulkhead to the fuselage skin. Further, the sealed bulkhead may easily be replaced when it is damaged, for example because of an impact with a bird.

Preferably, said radome area is substantially entirely delimited by said sealed bulkhead and by a radome.

Advantageously, said sealed bulkhead comprises an end which extends along the periphery of said bulkhead, said end being maintained in abutment against said fuselage skin by the pressure difference between said pressurized area and said non-pressurized radome area.

Thus, unlike the prior art described above wherein the overpressure in the pressurized area tends to break the rigid connection between the end of the sealed bulkhead and the fuselage skin, here the suppression is at the origin of maintaining this bulkhead end against the fuselage skin.

It is therefore no longer necessary to use a multitude of screws and/or rivets in order to ensure the rigid connection, which improves the manufacturing time and reduces the mass of the assembly.

Further, the use of the rigid connection between the sealed bulkhead and the fuselage skin is thereby avoided, a connection which is particularly sensitive to relative deformations of the bulkhead and of the fuselage skin and is therefore subject to structural fatigue which may lead to fatigue breaking.

Preferably, a fuselage structure frame is fixedly mounted on said fuselage skin and has an abutment portion receiving said end of the sealed bulkhead, and a plurality of blocking components is fixedly mounted on said frame so as to hold said peripheral end of the sealed bulkhead in position. Thus, unlike the prior art, wherein the sealed bulkhead usually attached to a structure frame, exerts compressive stress on the latter, the frame according to the invention is strained in traction, like most structure frames of the fuselage.

Advantageously, said fuselage structure frame comprises a circumferential portion extending substantially transversely to the longitudinal direction of the aircraft, said circumferential portion being located in said radome area.

Preferably, an antenna support is fixedly mounted on said sealed bulkhead, and located in the non-pressurized radome area, including a rigid shell at least partly enveloping a core in a shock-absorbing material.

Thus, the antenna support enables not only stiffening of the sealed bulkhead, but also ensures a protective function during an impact with an external body, for example a bird.

Further, unlike the prior art as described above, the radar antenna induces a flexural force on the bulkhead with less intensity. Indeed, the intensity of this force is proportional to the distance between the radar antenna and a plane passing through the whole of the points of the peripheral end of the bulkhead. Now, this distance is smaller in the case of a bulkhead with a general concave shape as seen from the radome area than in the case of a bulkhead with a convex shape. The risks of fatigue breaking of the bulkhead are thereby minimized.

Advantageously, said radome is mounted on a fuselage skin, the outer surface of said radome having aerodynamic continuity with the outer surface of said fuselage skin. Thus, the aerodynamic performances of the aircraft are improved.

Said sealed bulkhead is preferably made in composite material, for example of the resin and carbon and/or glass fibre mixture type. The sealed bulkhead then has reduced mass while maintaining significant mechanical performances.

The invention also relates to an aircraft comprising a front portion according to any of the preceding characteristics.

Other advantages and characteristics of the invention will become apparent in the non-limiting detailed description below.

SHORT DESCRIPTION OF THE DRAWINGS

Embodiments of the invention will now be described as non-limiting examples, with reference to the appended drawings, wherein.

DETAILED DISCUSSION OF A PREFERRED EMBODIMENT

Figure 2:
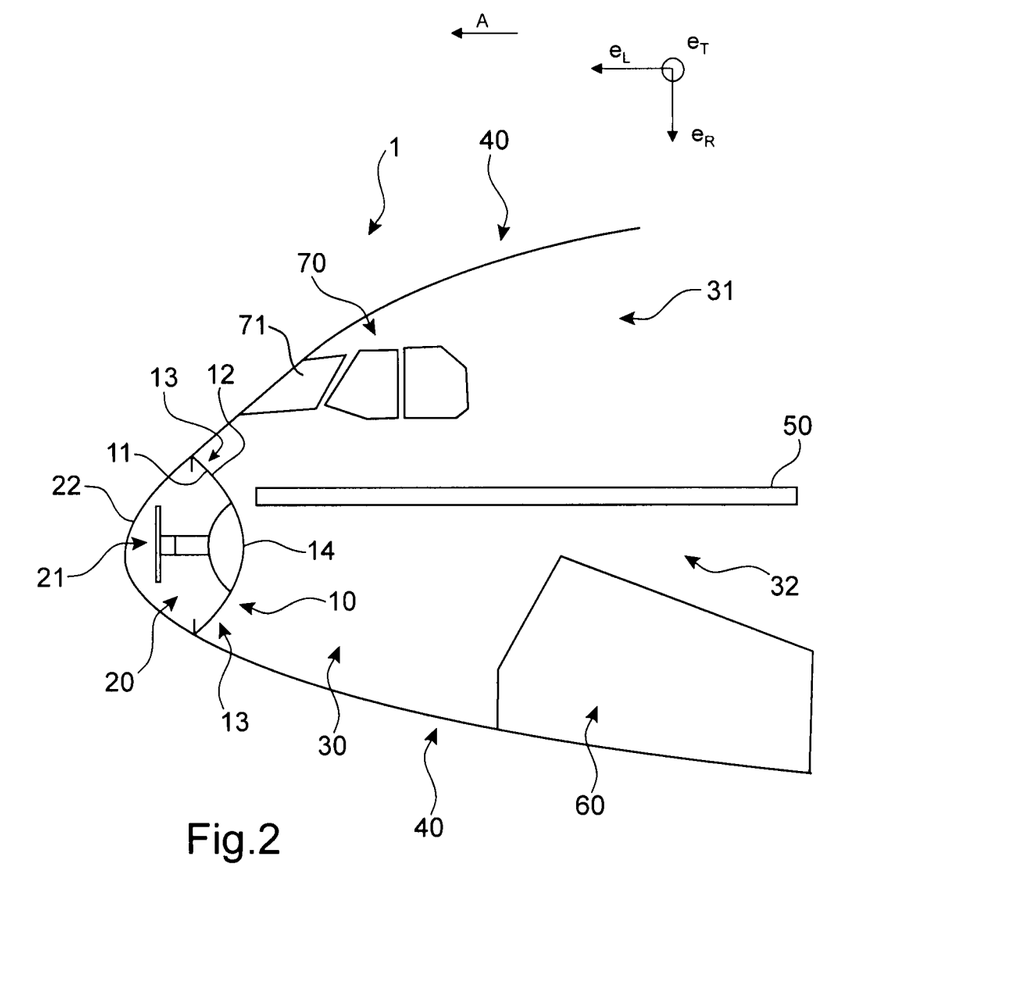
FIG. 2 is a longitudinal sectional view of an aircraft front portion according to the preferred embodiment of the invention.
Figure 3:
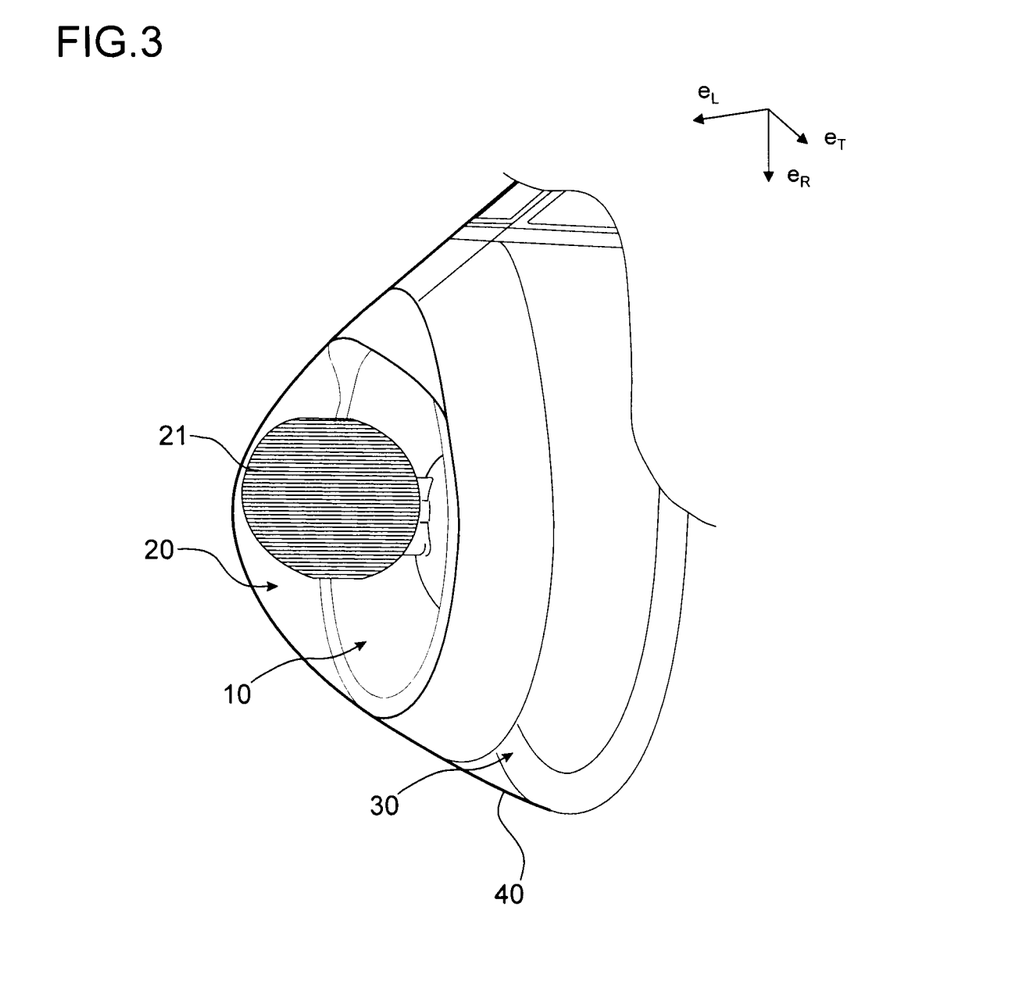
FIG. 3 is an enlarged perspective and detailed view of the front portion illustrated in FIG. 2.

FIGS. 2 and 3 illustrate an aircraft front portion according to the preferred embodiment of the invention.

A direct orthogonal reference system in cylindrical coordinates ($e_R, e_T, e_L$) is shown in FIG. 1. $e_R$ gives the radial direction of a point belonging to the aircraft, for example to the fuselage, $e_T$ the tangential or circumferential direction at this point and $e_L$ is the longitudinal direction; $e_L$ is parallel to the longitudinal axis of the fuselage.

On the other hand, the terms of "front" and "rear" refer to the forward motion direction of the aircraft resulting from the thrust of the turbojet engines, this direction being illustrated by the arrow A (FIG. 2).

The front portion 1 of the aircraft first of all comprises in its rearmost portion, a pressurized area 30 within which is found a separation floor 50 between an upper pressurized compartment generally dedicated to transporting passengers, and a lower pressurized compartment 32 under the floor, usually dedicated to storing technical equipment specific to the aircraft and/or to storing the payload.

The pressurized area 30 is delimited in the front by a sealed partition 10, also called front sealed bulkhead.

The front portion 1 also comprises a non-pressurized radome area 20, which is used for housing the radar antenna 21.

The radome area 20 is directly adjacent to the pressurized area 30 and is located at the extreme front of the front portion 1. The pressurized area 30 and the non-pressurized radome area 20 are directly separated from each other by said sealed bulkhead 10.

Said sealed bulkhead 10 is delimited by two surfaces opposite each other, one 11 being substantially concave when it is seen from said radome area 20 and the other one 12 being substantially convex when it is seen from said pressurized area 30.

According to the preferred embodiment of the invention, the sealed bulkhead 10 is of a general substantially concave shape when the bulkhead is seen or considered from the radome area 20. Thus, said two surfaces 11, 12 of the sealed bulkhead 10 are substantially parallel to each other.

This sealed bulkhead 10 includes a peripheral end 13 which extends along its periphery.

The whole of the points belonging to the peripheral end of the sealed bulkhead 10 are comprised in a plane which is transverse, preferably perpendicular to the longitudinal direction $e_L$ of the aircraft.

The bulkhead 10 is removably mounted on a fuselage skin 40 of the aircraft. The removable mounting of the bulkhead is described in detail later on.

The sealed bulkhead 10 is preferably made in composition material, for example of the resin and carbon and/or glass fibre mixture type.

Thus, the sealed bulkhead 10 has a general shape which extends towards the front of the aircraft, when moving along the bulkhead 10 from its centre 14 to its peripheral end 13.

It should be noted that FIGS. 2 and 3 illustrate a sealed bulkhead, the general shape of which has a concavity with a substantially constant average curvature. However, any other shape adapted to the encountered need may be suitable.

The pressurized area 30 then has an optimized volume. The cockpit 70 in the upper pressurized compartment 31 then benefits from more space just as the lower pressurized compartment 32.

The radome area 20 is delimited by a radome 22 mounted on the outer skin 40. Preferably, it is substantially entirely delimited by the radome 22 and said sealed bulkhead 10.

The radome 22 includes an outer surface which has aerodynamic continuity, at the level of the connection of the radome 22 on the outer skin 40, with the outer surface of the latter 40.

This aerodynamic connection is notably made possible by the general substantially concave shape of the sealed bulkhead 10 when it is seen from the radome area 20.

Indeed, with the concave shape of the sealed bulkhead 10, the radome area 20 may be reduced and therefore the total surface area of the radome 22 may be reduced. Thus, the connection of the radome 22 to the fuselage skin 40 in its upper portion may be considerably localized in front of the windscreen 71 of the cockpit 70. This connection may then have aerodynamic continuity between the radome 22 and the fuselage skin 40.

Moreover, the casing 60 of the front landing gear considerably shifted towards the rear of the front portion 1 of the aircraft is also illustrated in FIG. 2. This gear casing 60 is a non-pressurized area delimited by a set of walls. According to the invention, the sealed bulkhead 10 does not belong to the set of walls delimiting the gear casing 60.

Figure 4:
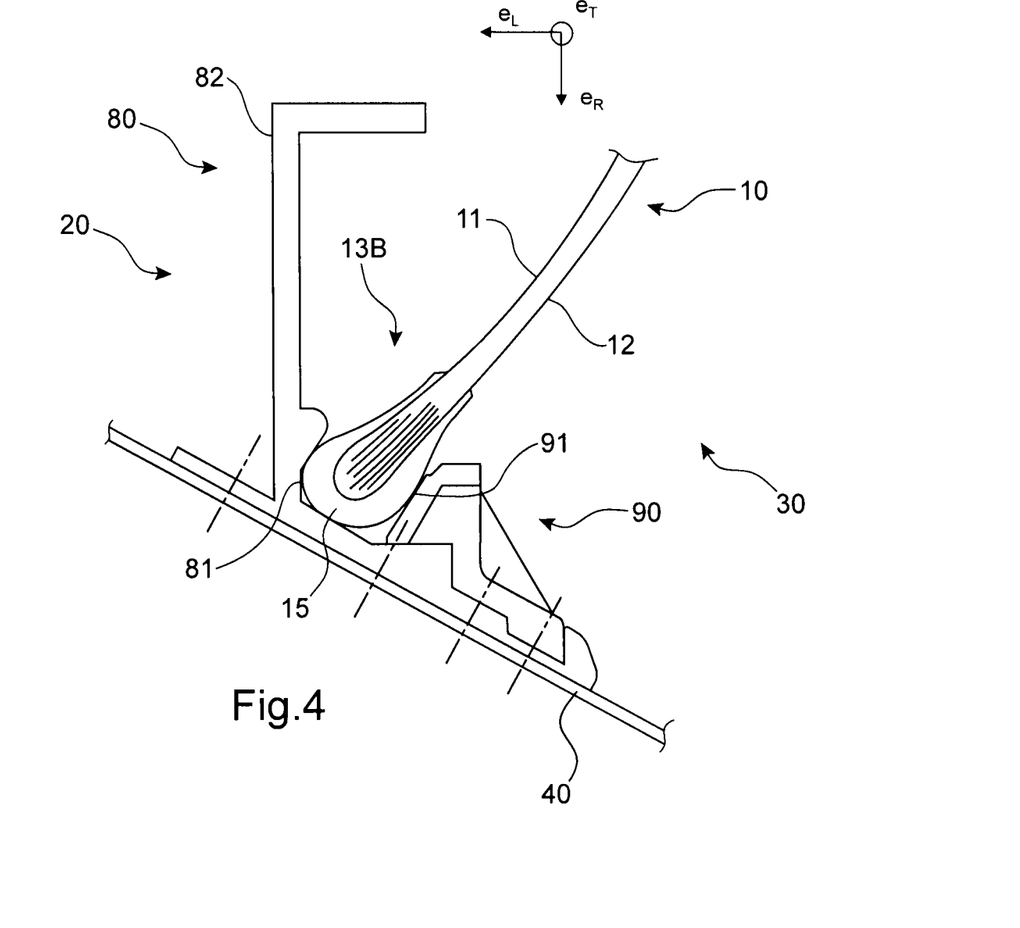
FIG. 4 is a partial longitudinal sectional view of an aircraft front portion according to an embodiment of the invention, illustrating the mounting of the bulkhead on the fuselage skin.

FIG. 4 is a longitudinal sectional view illustrating the method for mounting the bulkhead 10 on the fuselage skin 40 according to the preferred embodiment of the invention.

For the sake of clarity, FIG. 4 only illustrates the lower portion 10B of the bulkhead 10, the lower end 13B of which of the lower portion 10B is mounted on the fuselage skin 40.

A fuselage frame 80 is fixedly mounted on the fuselage skin 40. This frame 80 comprises an abutment portion 81 receiving said end 13B of the sealed bulkhead 10. Thus, the end 13B of the bulkhead 10 is in abutment against the abutment portion 81 of the structure frame 80.

It should be noted that according to the invention, the pressure difference between the pressurized area 30 and the non-pressurized radome area 20 exerts on the sealed bulkhead 10 a force which tends to maintain the end 13 of the bulkhead 10 in abutment against the fuselage skin 40 and more particularly against the abutment portion 81 of the fuselage frame 80.

The structure frame 80 includes a radial portion 82 which extends along the circumference of the frame. This radial portion is localized on the side of the radome area 20.

In order to maintain in position the lower end 13B of the bulkhead 10, against the abutment portion 81, a blocking component 90, also called bracket, is attached to the fuselage frame 80. The blocking component 90 includes a blocking surface 91 which comes into contact with the lower end 13B in order to avoid any movement of the latter, notably towards the rear, when the sealed bulkhead 10 is subject to mechanical stresses.

The blocking component 90 may be a single component which extends against any peripheral end 13 of the bulkhead 10.

Figure 5A:
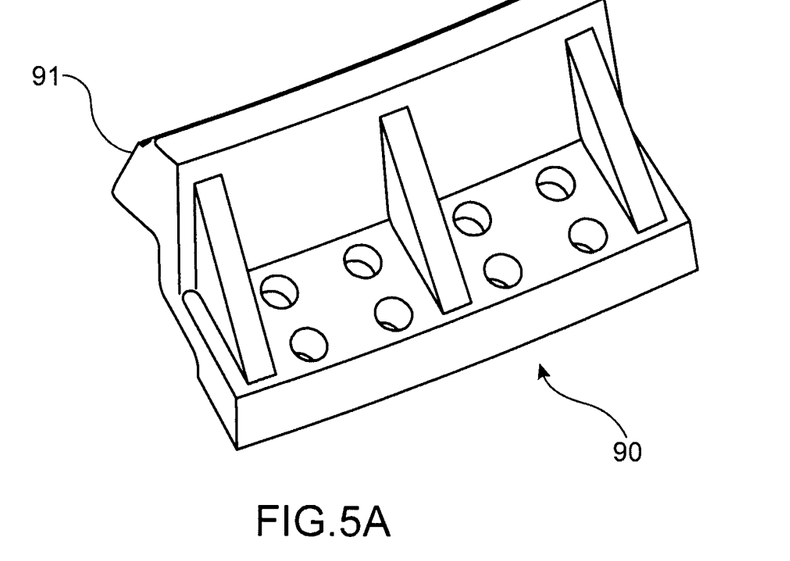
FIG. 5A is a perspective view of a blocking component according to the preferred embodiment of the invention.
Figure 5B:
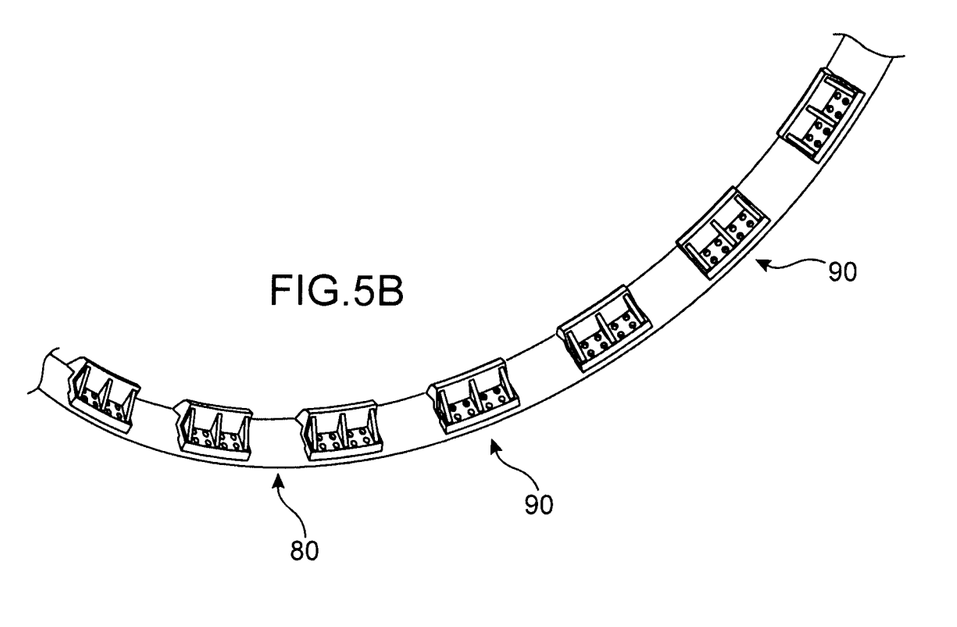
FIG. 5B is a perspective view of the distribution of these blocking components along the sealed bulkhead.

Alternatively, and preferably, a plurality of blocking components 90 is attached to the structure frame 80 as this is shown in FIGS. 5A and 5B. FIG. 5A illustrates the structure of one of said blocking components 90. FIG. 5B schematically illustrates the regular spaced-out arrangement of the blocking components 90 along the end 13 of the sealed bulkhead 10.

Preferably, in order to improve the seal of the sealed partition, a sealed gasket 15 is provided which covers the end 13 of the sealed bulkhead 10, over the whole periphery of the latter. The sealed gasket 15 is preferably flexible, for example of the silicon type, in order to damp relative displacements of the bulkhead 10 when it is subject to mechanical stresses.

Thus, the end 13 of the bulkhead is in contact with the abutment portion 81 of the structure frame 80, and with the blocking surface 91 of the blocking component 90, via the sealed gasket 15.

Figure 6:
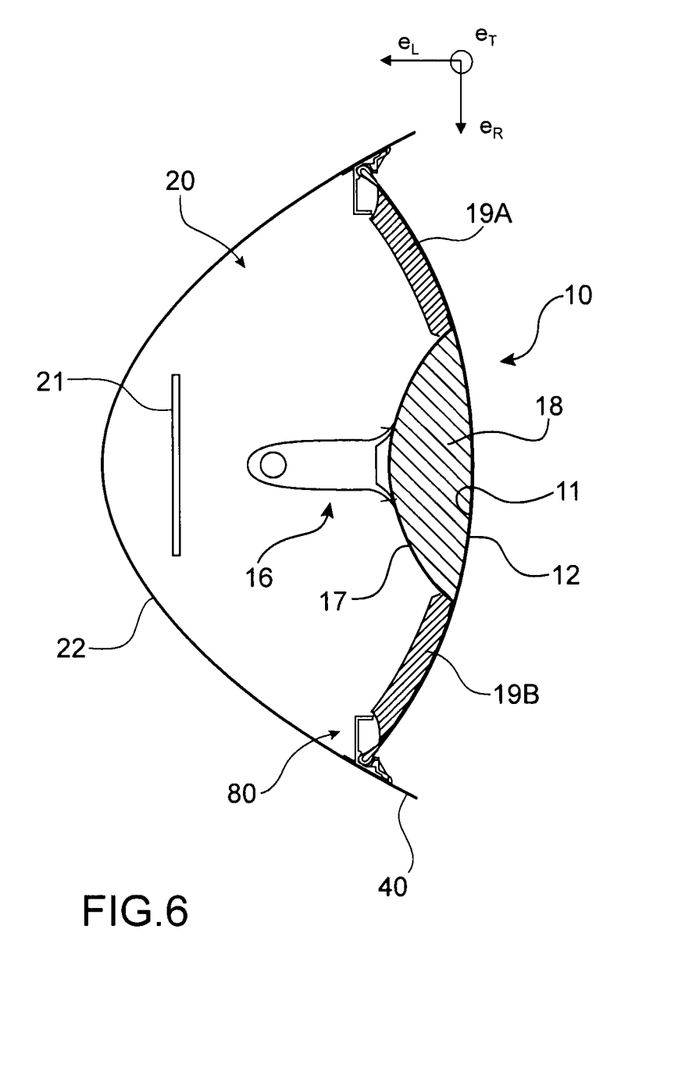
FIG. 6 is a longitudinal sectional view of an aircraft front portion according to an embodiment of the invention wherein the sealed bulkhead comprises impact protection components.

FIG. 6 illustrates the mounting of the radar antenna 21 on the sealed bulkhead 10, as well as the anti-bird impact structure which may be mounted on the bulkhead 10.

The sealed bulkhead 10 supports a radar antenna 21 localized in the radome area 20.

The radar antenna 21 is attached to the sealed bulkhead 10 via an antenna support 16. The antenna support 16 comprises a rigid shell 17 attached to the sealed bulkhead 10 on the concave surface 11 of the latter. The shell 17 delimits a core 18 made in a shock or impact absorbing material, such as for example a high density foam or a Nida structure (honeycomb structure).

Thus, with the antenna support 16 it is possible to stiffen the sealed bulkhead 10 essentially subject to compressive stresses because of the pressure difference between the pressurized area 30 and the radome area 20 on the one hand. On the other hand, the antenna support also ensures a protective function against the impact of a foreign body, such as a bird.

Preferably, as illustrated in FIG. 6, the sealed bulkhead 10 also comprises two protective components 19A and 19B against the impact of a bird, each positioned between the antenna support 16 and the end 13 of the bulkhead. These protective components 19A and 19B are made in a shock absorbing material such as high density foam or Nida.

Of course, various modifications may be made by one skilled in the art to the invention which has just been described, only as non-limiting examples. Thus, the sealed bulkhead may be fixedly mounted to the fuselage skin, for example via the structure frame.

The invention claimed is:

1. An aircraft front portion including
a sealed bulkhead separating a non-pressurized radome area from a pressurized area, wherein said sealed bulkhead is delimited by two surfaces opposite to each other one being substantially concave when it is seen from said radome area and the other one being substantially convex when it is seen from said pressurized area, wherein said sealed bulkhead is removably mounted on a fuselage skin, said sealed bulkhead comprises an end extending along the periphery of said bulkhead, said end being maintained in abutment against said fuselage skin by the pressure difference between said pressurized area and said non-pressurized radome area, further comprising a fuselage structure frame fixedly mounted on said fuselage skin and having an abutment portion receiving said end of the sealed bulkhead, wherein a plurality of blocking components are fixedly mounted on said frame so as to maintain in position said end of the sealed bulkhead.

2. The aircraft front portion according to claim 1, wherein each of said surfaces delimiting the bulkhead extends from its center towards its peripheral end, towards the front of the aircraft.

3. The aircraft front portion according to claim 1, wherein said sealed bulkhead has a general substantially concave shape, said concavity being oriented towards said radome area.

4. The aircraft front portion according to claim 1, wherein said fuselage structure frame comprises a circumferential portion extending substantially transversely to the longitudinal direction of the aircraft, said circumferential portion being located in said radome area.

5. The aircraft front portion according to claim 1, further comprising an antenna support fixedly mounted on said sealed bulkhead, and located in the non-pressurized radome area, including a rigid shell enveloping at least partly a core in an impact damping material.

6. The aircraft front portion according to claim 1, wherein said radome is mounted on a fuselage skin, the outer surface of said radome having aerodynamic continuity with the outer surface of said fuselage skin.

7. The aircraft front portion according to claim 1, wherein said sealed bulkhead is made of composite material.

8. An aircraft comprising an aircraft front portion according to any one of the preceding claims.

* * * * *